(12) United States Patent
Tsuji et al.

(10) Patent No.: US 10,316,108 B2
(45) Date of Patent: Jun. 11, 2019

(54) METHOD FOR PRODUCING XYLAN-CONTAINING MATERIAL

(71) Applicant: NIPPON PAPER INDUSTRIES CO., LTD., Tokyo (JP)

(72) Inventors: Shiho Tsuji, Tokyo (JP); Masayuki Watanabe, Tokyo (JP); Yutaka Nuruki, Tokyo (JP); Shoichi Miyawaki, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 55 days.

(21) Appl. No.: 15/543,623

(22) PCT Filed: Jan. 22, 2016

(86) PCT No.: PCT/JP2016/051868
§ 371 (c)(1),
(2) Date: Jul. 14, 2017

(87) PCT Pub. No.: WO2016/121648
PCT Pub. Date: Aug. 4, 2016

(65) Prior Publication Data
US 2017/0369598 A1    Dec. 28, 2017

(30) Foreign Application Priority Data
Jan. 26, 2015    (JP) .................... 2015-012791

(51) Int. Cl.
*C08B 37/00* (2006.01)
*C08B 37/14* (2006.01)
*D21C 11/04* (2006.01)

(52) U.S. Cl.
CPC .......... *C08B 37/0057* (2013.01); *C08B 37/14* (2013.01); *D21C 11/04* (2013.01)

(58) Field of Classification Search
CPC .... D21C 11/04; D21C 11/0007; D21C 3/222; D21C 3/04; D21C 3/20; C08B 37/0057; C08B 37/14; C08B 37/143; C08B 37/0003
See application file for complete search history.

(56) References Cited

U.S. PATENT DOCUMENTS

| | | | |
|---|---|---|---|
| 4,036,680 A | 7/1977 | Holton et al. | |
| 4,178,861 A * | 12/1979 | Vandernoek | D21C 3/222 162/72 |
| 9,657,146 B2 * | 5/2017 | Jansen | C08H 6/00 |
| 10,138,332 B2 * | 11/2018 | Jansen | C08B 37/0057 |
| 2002/0088576 A1 | 7/2002 | Andoh et al. | |
| 2007/0079944 A1 * | 4/2007 | Amidon | D21C 3/02 162/72 |
| 2008/0121356 A1 * | 5/2008 | Griffith | D21C 11/0085 162/16 |
| 2010/0276093 A1 * | 11/2010 | Varma | C08B 37/0003 162/55 |
| 2012/0067533 A1 | 3/2012 | Kurosu et al. | |
| 2014/0163245 A1 * | 6/2014 | Lake | C07D 307/48 549/489 |
| 2017/0226695 A1 * | 8/2017 | Rowlands | C10L 5/442 |
| 2017/0369598 A1 * | 12/2017 | Tsuji | C08B 37/0057 |

FOREIGN PATENT DOCUMENTS

| | | | | |
|---|---|---|---|---|
| EP | 3252083 A1 | * | 12/2017 | ......... C08B 37/0057 |
| EP | 3252083 A4 | * | 9/2018 | |
| JP | S48005952 A | | 1/1973 | |
| JP | S54085287 A | | 7/1979 | |
| JP | 63126984 A | * | 5/1988 | |
| JP | S63126984 A | | 5/1988 | |
| JP | 07145581 A | * | 6/1995 | |
| JP | H07145581 A | | 6/1995 | |
| JP | H10-46495 A | | 2/1998 | |
| JP | 2002115190 A | * | 4/2002 | |
| JP | 2002115190 A | | 4/2002 | |
| JP | 2004143629 A | * | 5/2004 | |
| JP | 2004143629 A | | 5/2004 | |
| JP | 2004530814 A | | 10/2004 | |
| JP | 2011178940 A | | 9/2011 | |
| JP | 2011178940 A | * | 9/2011 | |

(Continued)

OTHER PUBLICATIONS

Hashimoto, T., et al., "Studies on the Utilization of Xylan and Glucomanna in Woods, I Purification and Separation", Journal of the Phaemaceutical Society in Japan, 95(10):1239-1244, 1975.
Li et al., Hemicellulose Removal from Hardwood Chips in the Pre-Hydrolysis Step of the Kraft-Based Dissolving Pulp Production Process. Journal of Wood Chemistry and Technology. 2010;30:48-60.
Supplementary European Search Report for Application No. 16743251.7, dated Aug. 2, 2018. 6 pages.

*Primary Examiner* — Jose A Fortuna
(74) *Attorney, Agent, or Firm* — McCarter & English, LLP; Steven G. Davis; Wei Song

(57) ABSTRACT

An object of present invention is to provide a method for easily extracting and efficiently recovering xylan from wood. A xylan-containing material is produced by a method comprising steps of: (a) adding an acid and/or carbon dioxide to a black liquor discharged during a soda cooking step of wood chips including hardwood chips to adjust the pH of the black liquor to be in the range of 1 to 9, thereby giving a suspension; (b) dehydrating and washing an insoluble matter generated in the suspension to separately collect the insoluble matter; and (c) adding an organic solvent to the insoluble matter obtained at the step (b) to give a suspension, and separately collecting a xylan-containing material made of the insoluble matter present in the suspension by solid/liquid separation.

14 Claims, No Drawings

(56) References Cited

FOREIGN PATENT DOCUMENTS

| | | | | |
|---|---|---|---|---|
| JP | 2012180424 A | | 9/2012 | |
| JP | 2012180424 A | * | 9/2012 | |
| JP | 2013085523 A | | 5/2013 | |
| JP | 5485287 B2 | * | 5/2014 | ......... G11B 7/24038 |
| JP | 2016121648 A | * | 7/2016 | ............ B60W 20/50 |
| JP | 2017113024 A | * | 6/2017 | ......... C08B 37/0057 |
| WO | 2000077295 A1 | | 12/2000 | |
| WO | WO-0077295 A1 | * | 12/2000 | ............. D21C 3/022 |
| WO | WO-03002813 A2 | * | 1/2003 | ............... D21C 3/06 |
| WO | 2004/029356 A1 | | 4/2004 | |
| WO | 2010137535 A1 | | 12/2010 | |
| WO | WO-2010137535 A1 | * | 12/2010 | ............... D21C 3/02 |
| WO | WO-2012161916 A2 | * | 11/2012 | ........... C07D 307/48 |
| WO | WO-2016121648 A1 | * | 8/2016 | ......... C08B 37/0057 |

\* cited by examiner

METHOD FOR PRODUCING XYLAN-CONTAINING MATERIAL

CROSS-REFERENCE TO RELATED APPLICATIONS

This application is a U.S. national stage filing, under 35 U.S.C. § 371(c), of International Application No. PCT/JP2016/051868, filed on Jan. 22, 2016, which claims priority to Japanese Patent Application No. 2015-012791, filed on Jan. 26, 2015. The entire contents of each of the aforementioned applications are incorporated herein by reference.

TECHNICAL FIELD

The present invention relates to production of a xylan-containing material from a black liquor discharged during the soda cooking step of wood chips.

BACKGROUND ART

Xylan is a hemicellulose found in wood, rice straw, rice husk, corn cob, and the like, and is particularly abundant in hardwood (broadleaf trees). Xylan from hardwood is present as a glucuronoxylan that consists of a backbone of β-1,4-linked D-xylose residues and a side chain of an α-1,2-linked 4-O-methyl-D-glucuronic acid residue. The xylan degradation products, i.e., xylobiose and xylooligosaccharides, are widely used as functional materials in the fields of foods, pharmaceuticals and the like. Xylose is used as a source material for furan resins, a starting material for nylon polymerization, or a sugar source to produce useful materials such as ethanol.

Wood contains not only xylan but also cellulose, lignin and other hemicelluloses such as glucomannan; so, it is difficult to extract xylan alone. As a method for extracting xylan or its degradation products from wood, Japanese Patent Application Publication No. JP 2013-085523, for example, discloses a method for producing xylose, xylobiose, and/or xylooligosaccharides by performing treatment in the presence of water and at a temperature of 165 to 195° C.

Kraft pulp obtained by kraft cooking of wood is practically deprived of lignin; so, it is relatively easy to extract xylan from kraft pulp. Japanese Patent Application Publication No. JP 2011-178940 discloses a method for extracting xylan by subjecting kraft pulp to alkali extraction with 5 mass % or more of an alkaline solution.

CITATION LIST

Patent Literatures

Patent Literature 1: Japanese Patent Application Publication No. JP 2013-085523
Patent Literature 2: Japanese Patent Application Publication No. JP 2011-178940

SUMMARY

Technical Problem

However, in the method involving treating wood with hot water as disclosed in Japanese Patent Application Publication No. JP 2013-085523, the extraction rate of xylan is low, and xylan degrades into xylose, xylobiose and xylooligosaccharides which are made into an aqueous solution; so, it is difficult to separate and recover these components. The method involving treating kraft pulp with an alkaline solution as disclosed in Japanese Patent Application Publication No. JP 2011-178940 is not economical since a large amount of alkali is needed and also neutralization with a large amount of acid is required.

An object of the present invention is to provide a method for easily extracting and efficiently recovering xylan from wood.

Solution to Problem

The present inventors found that a xylan-containing material can be effectively produced by a production method comprising the steps of: (a) adding an acid and/or carbon dioxide to a black liquor discharged during a soda cooking step of wood chips including hardwood chips to adjust the pH to be in the range of 1 to 9, thereby giving a suspension; (b) dehydrating and washing an insoluble matter generated in the suspension to separately collect the insoluble matter; and (c) adding an organic solvent to the insoluble matter to give a suspension, and separately collecting the insoluble matter present in the suspension by solid/liquid separation.

The present invention includes, but is not limited to, the following embodiments.

(1) A method for producing a xylan-containing material, comprising the steps of: (a) adding an acid and/or carbon dioxide to a black liquor discharged during a soda cooking step of wood chips including hardwood chips to adjust the pH of the black liquor to be in the range of 1 to 9, thereby giving a suspension; (b) dehydrating and washing an insoluble matter generated in the suspension to separately collect the insoluble matter; and (c) adding an organic solvent to the insoluble matter obtained at the step (b) to give a suspension, and separately collecting a xylan-containing material made of the insoluble matter present in the suspension by solid/liquid separation.

(2) The method as set forth in (1), wherein at the step (a), carbon dioxide is added to the black liquor to adjust the pH to be in the range of 7 to 9.

(3) The method as set forth in (1) or (2), wherein the step (b) comprises the steps of: (b1) dehydrating and washing an insoluble matter generated in the suspension obtained at the step (a) to separately collect the insoluble matter; (b2) adding an acid to the collected insoluble matter to adjust the pH to be in the range of 1 to 9, thereby giving a suspension; (b3) dehydrating and washing an insoluble matter generated in the suspension obtained at the step (b2) to separately collect the insoluble matter; and (b4) adding an organic solvent to the insoluble matter collected at the step (b3) to give a suspension, and separately collecting the insoluble matter present in the suspension by solid/liquid separation.

(4) The method as set forth in any of (1) to (3), wherein during the soda cooking step of wood chips, a quinone compound is added.

(5) The method as set forth in any of (1) to (4), wherein the wood chips comprise 50 wt. % or more of hardwood chips.

Advantageous Effect of Invention

According to the present invention, a xylan-containing material with high xylan purity can be effectively produced using wood chips including hardwood chips as a source material.

DESCRIPTION OF EMBODIMENTS

The present invention is directed to a method for producing a xylan-containing material, comprising the steps of: (a)

adding an acid and/or carbon dioxide to a black liquor discharged during a soda cooking step of wood chips including hardwood chips to adjust the pH to be in the range of 1 to 9; (b) dehydrating and washing a resulting precipitated matter to separately collect the precipitated matter; and (c) adding an organic solvent to the insoluble matter obtained at the step (b) to give a suspension, and separately collecting the insoluble matter present in the suspension by solid/liquid separation. The following provides detailed descriptions of the different steps of this invention.

Soda Cooking Step

As a source material, wood including hardwood can be used. Specific examples of hardwood include, but are not limited to, Japanese beech (*Fagus crenata* Blume), Japanese lime (*Tilia japonica*), Japanese white birch (*Betula platyphylla*), poplar (*Populus*), eucalypt (*Eucalyptus*), acacia (*Acacia* Mill.), oak (*Quercus* L.), painted maple (*Acer pictum* subsp. *mono*), castor aralia (*Kalopanax pictus*), elm (*Ulmaceae* Mirbel), princess tree (*Paulownia tomentosa*), Japanese bigleaf magnolia (*Magnolia obovata*), willow (*Salix* L.), castor *aralia*, ubame oak (*Quercus phillyraeoides*), konara oak (*Quercus serrata*), sawtooth oak (*Quercus acutissima*), Japanese horse chestnut (*Aesculus turbinata*), Japanese zelkova (*Zelkova serrata*), Japanese cherry birch (*Betula grossa*), giant dogwood (*Cornus controversa*), and Japanese ash (*Fraxinus lanuginosa*). In the present invention, hardwood is used as a source wood material, but softwood (needleleaf tree wood) may also be added as long as the wood material includes hardwood. Examples of needleleaf trees include, but are not limited to, Japanese cedar (*Cryptomeria japonica*), Yezo spruce (*Picea jezoensis*), Japanese larch (*Larix kaempferi*), Japanese black pine (*Pinus thunbergii*), Sakhalin fir (*Abies sachalinensis*), Japanese white pine (*Pinus parviflora*), Japanese yew (*Taxus cuspidata*), Japanese thuja (*Thuja standishii*), tigertail spruce (*Picea torano*), Alcock's spruce (*Picea alcoquiana*), Buddhist pine (*Podocarpus macrophyllus*), Japanese fir (*Abies firma*), Sawara cypress (*Chamaecyparis pisifera*), Japanese Douglas fir (*Pseudotsuga japonica*), False arborvitae (*Thujopsis dolabrata*), Hiba arborvitae (*Thujopsis dolabrata*), southern Japanese hemlock (*Tsuga sieboldii*), northern Japanese hemlock (*Tsuga diversifolia*), hinoki cypress (*Chamaecyparis obtusa*), Japanese yew, Japanese plum yew (*Cephalotaxus harringtonia*), spruce (*Picea jezoensis* var. *hondoensis*), yellow cedar (*Chamaecyparis nootkatensis* Spach), Lawson's cypress (*Chamaecyparis lawsonia*), Douglas fir (*Pseudotsuga menziesii*), Sitka spruce (*Picea sitchensis*), Radiata pine (*Pinus radiata*), eastern spruce (*Picea Rubens*), eastern white pine (*Pinus strobus*), western larch (*Larix occidentalis*), western fir (*Abies grandis*), western hemlock (*Tsuga heterophylla*), and tamarack (*Larix occidentalis*). When hardwood and needleleaf tree wood are used in combination, the weight percentage of hardwood is preferably 50 wt. % or more, more preferably 75 wt. % or more.

After washing, chips together with a cooking liquor are charged into a cooking digester and subjected to soda cooking. The type of the cooking digester is not particularly limited and can be any of, for example, one-vessel liquid phase type, one-vessel steam/liquid phase type, two-vessel liquid/steam phase type, and two-vessel liquid phase type. Namely, in the present invention, the step of impregnating chips with an alkaline aqueous solution and holding them in this state may be provided separately from a conventional apparatus or section intended for penetration of a cooking liquor. Preferably, cooked unbleached pulp is washed in a washing machine like diffusion washer after removal of the cooking liquor. The kappa number of washed unbleached pulp is preferably in the range of 7 to 25, or may be in the range of 9 to 23. In one embodiment, the kappa number of washed unbleached pulp is in the range of 7 to 15, or may be in the range of 9 to 13.

The soda cooking step can be carried out by charging wood chips together with a soda cooking liquor into a pressure-resistant container, but the shape and size of the container are not particularly limited. The ratio of wood chips to a chemical liquor can be, for example, in the range of 1.0 to 40 L/kg, preferably 1.5 to 30 L/kg, more preferably 2.0 to 30 L/kg. In another embodiment, the ratio of wood chips to a chemical liquor can be, for example, in the range of 1.0 to 5.0 L/kg, preferably 1.5 to 4.5 L/kg, more preferably 2.0 to 4.0 L/kg.

Further, at the soda cooking step of the present invention, not only caustic soda (NaOH) but also other different digesting assistants may be used in combination. For example, it is preferable to charge a digester with an alkaline cooking liquor containing 0.01 to 5 mass % of a quinone compound based on the weight of bone dry chips. If the amount of a quinone compound charged is less than 0.01 mass %, a xylan-containing material is not adequately extracted in a black liquor. Also, if the amount of a quinone compound charged exceeds 5 mass %, there is no further increase in the amount of a xylan-containing material extracted.

The quinone compound to be used is a quinone compound, a hydroquinone compound, or a precursor thereof, which are used as so-called known digesting assistants, and at least one compound selected from these compounds can be used. Examples of these compounds include: quinone compounds such as anthraquinone, dihydroanthraquinone (e.g., 1,4-dihydroanthraquinone), tetrahydroanthraquinone (e.g., 1,4,4a,9a-tetrahydroanthraquinone, 1,2,3,4-tetrahydroanthraquinone), methyl anthraquinone (e.g., 1-methyl anthraquinone, 2-methyl anthraquinone), methyl dihydroanthraquinone (e.g., 2-methyl-1,4-dihydroanthraquinone), and methyl tetrahydroanthraquinone (e.g., 1-methyl-1,4,4a,9a-tetrahydroanthraquinone, 2-methyl-1,4,4a,9a-tetrahydroanthraquinone); hydroquinone compounds such as anthrahydroquinone (generally, 9,10-dihydroxyanthracene), methyl anthrahydroquinone (e.g., 2-methyl anthrahydroquinone), dihydroanthrahydroquinone (e.g., 1,4-dihydro-9,10-dihydroxyanthracene) or alkali metal salts thereof (e.g., disodium salt of anthrahydroquinone, disodium salt of 1,4-dihydro-9,10-dihydroxyanthracene); and precursors thereof, such as anthrone, anthranol, methylanthrone, and methylanthranol. These precursors have a potential to convert to a quinone compound or a hydroquinone compound under cooking conditions.

When wood chips of a hardwood are used, the cooking liquor can be charged at an active alkali (AA) charge of 8 to 55 wt. %, preferably 8 to 20 mass %, based on the weight of bone dry wood chips. If the AA charge is less than 8 mass %, lignin and hemicelluloses are not fully removed. If the AA charge is more than 55 mass %, deterioration of yield and quality occurs. As referred to above, the active alkali (AA) charge refers to the charge of NaOH calculated in terms of $Na_2O$ charge. NaOH charge can be converted to $Na_2O$ charge by multiplying by 0.775.

Soda cooking is preferably carried out at a temperature ranging from 140 to 180° C., more preferably from 150 to 170° C. If the temperature is too low, a xylan-containing material is not adequately eluted in a black liquor. If the temperature is too high, the degree of polymerization of eluted xylan decreases, so that it becomes more difficult to recover xylan at a subsequent step. In the present invention, the cooking time refers to the time from when the cooking temperature reaches its maximum until when the temperature starts dropping. The cooking time can be in the range of not less than 20 minutes and not more than 600 minutes, preferably not less than 60 minutes and not more than 600 minutes, more preferably not less than 120 minutes and not more than 360 minutes. If the cooking time is less than 60 minutes, a xylan-containing material is not adequately eluted. If the cooking time is more than 600 minutes, degradation of eluted xylan occurs, so that it become more difficult to recover xylan at a subsequent step.

Also, in the present invention, the treatment temperature and time of soda cooking can be determined using an H-factor (Hf) as an index. The H-factor is an indication of the total amount of heat applied to a reaction system during a cooking process, and is represented by the equation given below. The H-factor is calculated by performing time integration from the time when chips and water are mixed until the time of completion of cooking. In this invention, the H-factor is preferably in the range of 250 to 1500, more preferably 300 to 1500. If the H-factor is less than 250, elution of a xylan-containing material in a black liquor does not sufficiently proceed. Also, an H-factor of more than 1500 is not preferred since degradation of eluted xylan occurs, so that it become more difficult to recover xylan at a subsequent step.

$$Hf = \int \exp(43.20 - 16113/T) dt \quad \text{Eq. 1}$$

[where T represents an absolute temperature at a certain point of time.]

In the present invention, unbleached pulp obtained after cooking can be subjected to various treatments depending on the need. For example, unbleached pulp obtained after kraft cooking can be subjected to bleaching treatment.

Treatment of a Black Liquor with an Acid and/or Carbon Dioxide

An acid and/or carbon dioxide is added to a black liquor obtained after soda cooking to adjust the pH of the black liquor to be in the range of 1 to 9, preferably 2 to 8, thereby giving a suspension. By doing so, a xylan-containing material dissolved in the black liquor can be insolubilized. This treatment step may be repeated two or more times. If the pH exceeds 9, an insoluble matter of a xylan-containing material is not sufficiently produced. If the pH is less than 1, a xylan-containing material degrades resulting in a decrease in the yield of recovery of an insoluble matter. The acid to be used may be an inorganic acid or an organic acid. Examples of the inorganic acid include, but are not limited to, sulfuric acid, sulfurous acid, hydrochloric acid, nitric acid, nitrous acid, phosphoric acid, and carbonic acid, with sulfuric acid being preferred. A residual acid discharged from a chlorine dioxide generator may also be used. Examples of the organic acid include, but are not limited to, acetic acid, lactic acid, oxalic acid, citric acid, and formic acid. Additionally, the black liquor can be concentrated using an evaporator or the like before pH adjustment, and has a solids content of preferably 10 mass % or more, and more preferably from 20 mass % or more to 50 mass %.

The temperature at which the pH of the black liquor is adjusted to be in the range of 1 to 9 is preferably in the range of room temperature to 100° C. If the temperature exceeds 100° C., lignin condensation occurs, so that a xylan-containing material becomes difficult to separate.

When both an acid and carbon dioxide are added at the aforementioned step of adjusting the pH to be in the range of 1 to 9, it is preferable to provide a step of adding carbon dioxide to adjust the pH to be in the range of 7 to 9 before addition of an acid. The temperature of this treatment is not particularly limited, but is preferably about 80° C. The method for adding carbon dioxide is not particularly limited, and includes a method for infusing carbon dioxide under atmospheric pressure, or a method for infusing carbon dioxide in a sealed container to apply pressure (0.1 to 1 MPa). As carbon dioxide, a pure carbon dioxide gas may be used, or a combustion exhaust gas discharged from an incinerator, a boiler, etc., or a carbon dioxide-containing gas generated during a lime calcination process, etc. may also be used.

If necessary, a coagulant may be added to promote the precipitation of a xylan-containing material. Examples of the coagulant include, but are not limited to, aluminum sulfide, aluminum chloride, polyaluminum chloride, polyamine, DADMAC, melamine acid colloid, and dicyandiamide.

Separate Collection of an Insoluble Matter Generated in a Suspension

The suspension obtained by adding an acid and/or carbon dioxide to a black liquor to adjust the pH of the liquor to be in the range of 1 to 9 contains a xylan-containing insoluble matter. In the present invention, the xylan-containing insoluble matter is separately collected by dehydrating the suspension and washing it with water. Examples of a system that can be used for dehydrating and washing the insoluble matter include, but are not limited to, filter press, drum press, centrifugal dehydrator, and vacuum filtration system. It is preferred that the water used for washing have a pH of 1 to 9 and a temperature of from room temperature to 80° C.

Also, after the aforementioned step of adding carbon dioxide to adjust the pH to be in the range of 1 to 9, the precipitation is dehydrated and washed in the same way.

Purification Using an Organic Solvent

In the present invention, an organic solvent is added to the dehydrated and washed insoluble matter of a xylan-containing material to give a suspension. The organic solvent to be added is a non-solvent or poor solvent for sugar. For example, one or a combination of two or more of the following solvents, or a mixture of one or a combination of two or more of the following solvents with water, can be used: alcohols including methanol, ethanol, isopropyl alcohol, 2-methoxy ethanol and butanol; ethers including 1,4-dioxane and tetrahydrofuran; ketones including acetone and methyl ethyl ketone; nitriles including acetonitrile; amines including pyridine; amides including formamide; esters including ethyl acetate and methyl acetate; aliphatic hydrocarbons including hexane; aromatic hydrocarbons including benzene and toluene; and others. In particular, acetone is preferred. By adding an organic solvent, impurities such as lignin can be dissolved resulting in increased purity of xylan in a xylan-containing material. The amount of an organic solvent to be added is not particularly limited; for example, the organic solvent can be used in an amount two or more times, preferably five or more times, more preferably ten or more times, the weight of an insoluble matter.

In the present invention, the thus-obtained suspension is subjected to solid/liquid separation to recover a xylan-containing material. Solid/liquid separation of an insoluble matter (xylan-containing material) present in a suspension can be carried out using a method such as filter press, drum press, centrifugal dehydrator, or vacuum filtration system.

Since dissolved lignin is present in a dissolved matter in an organic solvent, lignin can also be separately collected simultaneously in the present invention.

The xylan-containing material obtained in the present invention is highly pure, so that xylooligosaccharides and xylose can be easily produced by degrading the xylan-containing material with an acid or enzyme. In a preferred embodiment, the xylan-containing material obtained in this invention has a xylan content of 5 wt. % or more, preferably 10 wt. % or more, more preferably 15 wt. % or more.

EXAMPLES

Hereunder, the present invention will be described in detail by way of working examples, but this invention is not limited to these examples. Unless otherwise specified, the percentage as used herein refers to a percentage by mass.

Production of Xylan-Containing Materials

Example 1

<Soda Cooking>

A 2.4 L rotary autoclave was charged with 300 bone dry grams of *Eucalyptus* chips, and a chemical cooking liquor made of a mixture of sodium hydroxide with water was added so as to give a sodium hydroxide concentration of 23% (relative to the weight of chips) and a liquor-to-wood ratio of 3 L/kg. Soda cooking was carried out at 160° C. and an H-factor of 800 to obtain pulp and a black liquor.

<Coarse Purification of Lignin>

Carbon dioxide treatment: The black liquor (with a solids content of 22%) was charged into a beaker, preheated to 80° C., and then treated for 30 minutes with stirring in a pressure-resistant container pressurized with 0.3 MPa of carbon dioxide, to thereby adjust the pH to 7.5. The treated liquor was subjected to solid/liquid separation by vacuum dehydration using a glass filter (GS-25, produced by ADVANTEC), and then to the solids remaining on the glass filter, water was added in an amount of half that of the black liquor to make the solids into a slurry again.

Acid treatment: Sulfuric acid was added to the slurry to adjust the pH to 2. The slurry (with a solids concentration of about 10%) was preheated to 80° C. and subjected to solid/liquid separation by vacuum dehydration using a glass filter (GS-25, produced by ADVANTEC). Then, the solids remaining on the glass filter were washed with hot water (80° C.) in an amount of half that of the black liquor and subjected to further vacuum dehydration. The solids remaining on the glass filter were dried in air to yield coarsely purified lignin.

<Solid/Liquid Separation Using an Organic Solvent (Acetone Extraction)>

To the resulting coarsely purified lignin, 10 times its volume of acetone (mL/g) was added, " " and the contents were stirred well and then left to stand at room temperature overnight. After the mixture was subjected to solid/liquid separation using a filter paper (No. 2, produced by ADVANTEC) followed by washing with 50 times its volume of acetone (mL/g), the resulting solids were dried in air to yield an acetone-extracted residue (xylan-containing material).

Example 2

An acetone-extracted residue (xylan-containing material) was obtained by the same procedure as in Example 1, except that for the purpose of performing cooking, tetrahydroanthraquinone (disodium 1,4-dihydro-9,10-dihydroxyanthracene, produced by Kawasaki Kasei Chemicals Ltd., product name: SAQ) was added to a chemical cooking liquor to give a concentration of 0.1% (relative to the weight of chips) and soda/anthraquinone cooking was carried out at an H-factor of 400.

Example 3

An acetone-extracted residue (xylan-containing material) was obtained by the same procedure as in Example 2, except that no carbon dioxide treatment was done. To be specific, a black liquor (with a solids concentration of about 22%) obtained by soda/anthraquinone cooking was subjected to acid treatment by adding sulfuric acid to adjust the pH to 2.

Example 4

A 2.4 L rotary autoclave was charged with 200 bone dry grams of *Eucalyptus* chips, and a chemical cooking liquor made of a mixture of sodium hydroxide and tetrahydroanthraquinone with water was added so as to give a sodium hydroxide concentration of 40% (relative to the weight of chips), a tetrahydroanthraquinone concentration of 0.02% (relative to the weight of chips) and a liquor-to-wood ratio of 10 L/kg. Soda/anthraquinone cooking was carried out at 160° C. and an H-factor of 800 to obtain pulp and a black liquor. After the resulting black liquor was concentrated 10-fold at 90° C., coarse purification of lignin and acetone extraction were done by the same procedure as in Example 1 to yield an acetone-extracted residue.

Example 5

Soda/anthraquinone cooking was carried out by the same procedure as in Example 4, except that a chemical cooking liquor was added to 33 bone dry grams of chips so as to give a sodium hydroxide concentration of 120% (relative to the weight of chips), a tetrahydroanthraquinone concentration of 0.02% (relative to the weight of chips) and a liquor-to-wood ratio of 30 L/kg. After the resulting black liquor was concentrated 30-fold at 90° C., an acetone-extracted residue was obtained by the same procedure as in Example 1.

Example 6

Pulp and a black liquor were obtained by the same procedure as in Example 4, except that soda/anthraquinone cooking was done at a temperature of 170° C. After the resulting black liquor was concentrated 10-fold at 90° C., an acetone-extracted residue was obtained by the same procedure as in Example 1.

Example 7

Pulp and a black liquor were obtained by the same procedure as in Example 2, except that for the purpose of performing cooking, a chemical cooking liquor was added so as to give a sodium hydroxide concentration of 40% (relative to the weight of chips) and a tetrahydroanthraquinone concentration of 0.02% (relative to the weight of chips) and the H-factor was set to 800. From the resulting black liquor, an acetone-extracted residue was obtained by the same procedure as in Example 1.

Comparative Example 1 (Needleleaf Tree)

For the purpose of performing cooking, a 2.4 L rotary autoclave was charged with 300 bone dry grams of *Cryptomeria japonica* chips, and a chemical cooking liquor made of a mixture of sodium hydroxide and tetrahydroanthraquinone (disodium 1,4-dihydro-9,10-dihydroxyanthracene, produced by Kawasaki Kasei Chemicals Ltd., product name: SAQ) with water was added so as to give a sodium hydroxide concentration of 23% (relative to the weight of chips), a tetrahydroanthraquinone concentration of 0.1% (relative to the weight of chips) and a liquor-to-wood ratio of 3 L/kg. Then, soda/anthraquinone cooking was carried out at 170° C. and an H-factor of 1500. A black liquor obtained by cooking was treated by the same procedure as in Example 1 to obtain an acetone-extracted residue (xylan-containing material).

Comparative Example 2 (Needleleaf Tree/Kraft Cooking)

An acetone-extracted residue (xylan-containing material) was obtained by performing treatment by the same procedure as in Example 1, except that for the purpose of performing cooking, a 2.4 L rotary autoclave was charged with 300 bone dry grams of *Cryptomeria japonica* chips, and while a mixture of sodium hydroxide, sodium sulfide and tetrahydroanthraquinone (disodium 1,4-dihydro-9,10-dihydroxyanthracene, produced by Kawasaki Kasei Chemicals Ltd., product name: SAQ) with water was used as a chemical cooking liquor so as to give a sodium hydroxide concentration of 18% (relative to the weight of chips), a sodium sulfide concentration of 4.5% (relative to the weight of chips), a tetrahydroanthraquinone concentration of 0.1% (relative to the weight of chips) and a liquor-to-wood ratio of 3 L/kg, kraft cooking was carried out at an H-factor of 800.

Comparative Example 3 (Kraft Cooking)

An acetone-extracted residue (xylan-containing material) was obtained by performing treatment by the same procedure as in Example 1, except that for the purpose of performing cooking, a 2.4 L rotary autoclave was charged with 300 bone dry grams of *Eucalyptus* chips, and while a mixture of sodium hydroxide, sodium sulfide and tetrahydroanthraquinone (disodium 1,4-dihydro-9,10-dihydroxyanthracene, produced by Kawasaki Kasei Chemicals Ltd., product name: SAQ) with water was used as a chemical cooking liquor so as to give a sodium hydroxide concentration of 12% (relative to the weight of chips), a sodium sulfide concentration of 4% (relative to the weight of chips), a tetrahydroanthraquinone concentration of 0.1% (relative to the weight of chips) and a liquor-to-wood ratio of 3 L/kg, kraft cooking was carried out at an H-factor of 800.

Reference Example

A 2.4 L rotary autoclave was charged with 300 bone dry grams of *Eucalyptus* chips, and water was added to give a liquid-to-wood ratio of 3 L/kg. The contents were subjected to prehydrolysis treatment by holding at 170° C. for 30 minutes and then to solid/liquid separation, whereby prehydrolyzed chips and a prehydrolysis liquor were obtained. To the prehydrolyzed chips, a cooking liquor (with a sodium hydroxide concentration of 23% (relative to the weight of untreated chips; prepared by mixing sodium hydroxide and SAQ (produced by Kawasaki Kasei Chemicals Ltd.) so as to give a liquid-to-wood ratio of 3 L/kg) was added, and soda cooking was carried out at 160° C. and an H-factor of 800 to obtain pulp and a black liquor.

Product Analysis

The coarsely purified lignins, acetone-extracted residues, and pulps obtained from the aforementioned experiments were analyzed for different parameters mentioned below.

<Xylan Purity (%)>

First, 300 mg of dry samples (coarsely purified lignin, acetone-extracted residue, pulp) were reacted in 3 mL of 72% sulfuric acid at 30° C. for one hour, and then diluted to give a sulfuric acid concentration of 4%. The dilution was further heated at 121° C. for one hour to undergo hydrolysis reaction, whereby a monosaccharide solution was obtained. The resulting solution was diluted as appropriate and quantified for monosaccharide content by ion chromatography (DX-500 produced by Dionex; column: AS-7; eluent: water; flow rate: 1.1 mL/min). Based on the xylose content in the acid-hydrolyzed solution, xylan purity was calculated by the following equation.

Xylan purity (%)=[xylose content (mg)×0.88/sample weight (mg)]×100

The prehydrolysis liquor obtained by prehydrolysis treatment in Reference Example was also analyzed for its xylan purity. 1 mL of the prehydrolysis liquor was added to 20 mL of 4% sulfuric acid, and the mixture was heated at 121° C. for one hour to undergo hydrolysis reaction, whereby a monosaccharide solution was prepared. The resulting monosaccharide solution was quantified for its monosaccharide content by ion chromatography as mentioned above, and on that basis, the xylan purity of the prehydrolysis liquor of Comparative Example 4 was calculated.

<Lignin Purity (%)>

Coarsely purified lignins were also analyzed for lignin purity (weight percentage of lignin). During the xylan purity analysis, a residue filtered out of the hydrolysis reaction solution was dried and measured for weight to determine the weight of Klason lignin (mg). The filtrate was diluted with 4% sulfuric acid as appropriate and analyzed for absorbance at 205 nm ($A_{205}$), and on that basis, the weight of acid-soluble lignin was calculated by the following equation.

Weight of acid-soluble lignin (mg)=$A_{205}$×dilution factor×solution amount (mL)/110

Lignin purity can be calculated based on the weight of Klason lignin (mg, residue) and the weight of acid-soluble lignin (mg, filtrate) by using the following equation.

Lignin purity=(weight of Klason lignin+weight of acid-soluble lignin)/acetone-extracted residue×100(%)

<Other Components (%)>

The weight percentage (%) of other components contained in coarsely purified lignins was calculated by the following equation.

Other components (%)=100−(lignin purity (%)+xylan purity (%))

TABLE 1

| | Coarsely purified lignin | | | Acetone-extracted residue | Pulp Xylan |
|---|---|---|---|---|---|
| | Lignin (%) | Xylan (%) | Others (%) | Xylan purity (%) | purity (%) |
| Ex. 1 | 72 | 21 | 7 | 36 | 16 |
| Ex. 2 | 59 | 31 | 10 | 53 | 15 |
| Ex. 3 | 71 | 20 | 9 | 57 | 15 |
| Ex. 4 | 73 | 20 | 7 | 61 | 16 |
| Ex. 5 | 73 | 18 | 9 | 51 | 11 |

TABLE 1-continued

|  | Coarsely purified lignin | | | Acetone-extracted residue | Pulp Xylan |
| --- | --- | --- | --- | --- | --- |
|  | Lignin (%) | Xylan (%) | Others (%) | Xylan purity (%) | purity (%) |
| Ex. 6 | 67 | 26 | 7 | 65 | 14 |
| Ex. 7 | 60 | 34 | 6 | 79 | 9 |
| Com. Ex. 1 | 92 | 2 | 6 | 3 | 14 |
| Com. Ex. 2 | 94 | 1 | 5 | 2 | 15 |
| Com. Ex. 3 | 96 | 1 | 1 | 4 | 20 |

As shown in Table 1, it was confirmed that the acetone-extracted residues obtained by the methods of Examples 1 to 7 were xylan-containing materials with high xylan purity, and that a higher purity of xylan can be obtained from these residues than from woods.

In Reference Example where wood chips were prehydrolyzed, a high purity of xylan-containing material was obtained from the prehydrolysis liquor (xylan purity of prehydrolysis liquor: about 47%; xylan purity of pulp: about 4%; xylan purity of black liquor: about 1%). However, the present invention is more advantageous because the prehydrolysis liquor is a low-concentration liquid (with a solids content of about 5%) and requires a further concentration step in practical use.

The invention claimed is:

1. A method for producing a xylan-containing material, comprising the steps of:
   (a) adding an acid and/or carbon dioxide to a black liquor discharged during a soda cooking step of wood chips including hardwood chips to adjust the pH of the black liquor to be in the range of 1 to 9, thereby giving a suspension;
   (b) dehydrating and washing an insoluble matter generated in the suspension to separately collect the insoluble matter; and
   (c) adding an organic solvent to the insoluble matter obtained at the step (b) to give a suspension, and separately collecting a xylan-containing material made of the insoluble matter present in the suspension by solid/liquid separation, wherein the organic solvent is used in an amount two or more times of the weight of the insoluble matter.

2. The method according to claim 1, wherein at the step (a), carbon dioxide is added to the black liquor to adjust the pH to be in the range of 7 to 9.

3. The method according to claim 2, wherein the step (b) comprises the steps of:
   (1) dehydrating and washing an insoluble matter generated in the suspension obtained at the step (a) to separately collect the insoluble matter;
   (2) adding an acid to the collected insoluble matter to give a suspension having the pH in the range of 1 to 9;
   (3) dehydrating and washing an insoluble matter generated in the suspension obtained at the step (2) to separately collect the insoluble matter; and
   (4) adding an organic solvent to the insoluble matter collected at the step (3) to give a suspension, and separately collecting the insoluble matter present in the suspension by solid/liquid separation.

4. The method according to claim 3, wherein during the soda cooking step of wood chips, a quinone compound in an amount of from 0.01 to 5% by weight based on the weight of wood chips is added.

5. The method according to claim 4, wherein the wood chips comprise 50 wt. % or more of hardwood chips.

6. The method according to claim 2, wherein during the soda cooking step of wood chips, a quinone compound in an amount of from 0.01 to 5% by weight based on the weight of dry wood chips is added.

7. The method according to claim 2, wherein the wood chips comprise 50 wt. % or more of hardwood chips.

8. The method according to claim 1, wherein the step (b) comprises the steps of:
   (1) dehydrating and washing an insoluble matter generated in the suspension obtained at the step (a) to separately collect the insoluble matter;
   (2) adding an acid to the collected insoluble matter to give a suspension having the pH in the range of 1 to 9;
   (3) dehydrating and washing an insoluble matter generated in the suspension obtained at the step (2) to separately collect the insoluble matter; and
   (4) adding an organic solvent to the insoluble matter collected at the step (3) to give a suspension, and separately collecting the insoluble matter present in the suspension by solid/liquid separation.

9. The method according to claim 8, wherein during the soda cooking step of wood chips, a quinone compound in an amount of from 0.01 to 5% by weight based on the weight of dry wood chips is added.

10. The method according to claim 8, wherein the wood chips comprise 50 wt. % or more of hardwood chips.

11. The method according to claim 1, wherein during the soda cooking step of wood chips, a quinone compound in an amount of from 0.01 to 5% by weight based on the weight of dry wood chips is added.

12. The method according to claim 11, wherein the wood chips comprise 50 wt. % or more of hardwood chips.

13. The method according to claim 1, wherein the wood chips comprise 50 wt. % or more of hardwood chips.

14. The method according to claim 1, wherein the organic solvent comprises acetone.

* * * * *